(12) United States Patent
Xu et al.

(10) Patent No.: US 10,470,239 B2
(45) Date of Patent: Nov. 5, 2019

(54) DEVICE IN WIRELESS COMMUNICATION SYSTEM AND METHOD

(71) Applicant: SONY CORPORATION, Tokyo (JP)

(72) Inventors: Xiaodong Xu, Beijing (CN); Yateng Hong, Beijing (CN); Ya Liu, Beijing (CN); Xi Ke, Beijing (CN)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 15/313,797

(22) PCT Filed: May 26, 2015

(86) PCT No.: PCT/CN2015/079805
§ 371 (c)(1),
(2) Date: Nov. 23, 2016

(87) PCT Pub. No.: WO2015/184957
PCT Pub. Date: Dec. 10, 2015

(65) Prior Publication Data
US 2017/0202052 A1 Jul. 13, 2017

(30) Foreign Application Priority Data

Jun. 4, 2014 (CN) .......................... 2014 1 0244379

(51) Int. Cl.
*H04W 72/08* (2009.01)
*H04W 76/28* (2018.01)
(Continued)

(52) U.S. Cl.
CPC ....... *H04W 76/28* (2018.02); *H04W 52/0206* (2013.01); *H04W 52/0216* (2013.01);
(Continued)

(58) Field of Classification Search
CPC .......... H04W 76/048; H04W 52/0248; H04W 72/082
See application file for complete search history.

(56) References Cited

U.S. PATENT DOCUMENTS 8,588,831 B2 11/2013 Chen et al.
8,737,994 B2 5/2014 Awoniyi et al.
(Continued)

FOREIGN PATENT DOCUMENTS

CN 101742618 A 6/2010
CN 101931890 A 12/2010
CN 103262622 A 8/2013

OTHER PUBLICATIONS

International Search Report dated Aug. 28, 2015, in PCT/CN2015/079805, filed May 26, 2015.

*Primary Examiner* — Zhiren Qin
(74) *Attorney, Agent, or Firm* — Xsensus LLP

(57) ABSTRACT

A device and method in a wireless communication system. The device includes: a cell configuration unit configured to control periodic discontinuous transmission mode of cells according to a load condition of the cells and/or interference condition between the cells, and configure parameters of the periodic discontinuous transmission mode including periods; and a user equipment configuration unit configured to configure parameters of periodic discontinuous reception mode of a user equipment including periods according to the parameters of the periodic discontinuous transmission mode, so that the periods of the periodic discontinuous reception mode of the user equipment are compatible with the periods of the periodic discontinuous transmission mode, wherein each period of the periodic discontinuous transmission mode includes an activation time period and a dormancy time period, and a cell provides a service for the user equipment during the activation time period.

19 Claims, 6 Drawing Sheets

(51) Int. Cl.
*H04W 76/20* (2018.01)
*H04W 52/02* (2009.01)

(52) U.S. Cl.
CPC ..... *H04W 52/0248* (2013.01); *H04W 72/082* (2013.01); *H04W 76/20* (2018.02); *Y02D 70/00* (2018.01); *Y02D 70/1262* (2018.01); *Y02D 70/23* (2018.01); *Y02D 70/24* (2018.01); *Y02D 70/25* (2018.01)

(56) References Cited

U.S. PATENT DOCUMENTS

| | | | | |
|---|---|---|---|---|
| 2009/0180414 | A1* | 7/2009 | Maeda | H04B 7/2643 370/311 |
| 2010/0113045 | A1* | 5/2010 | Iwamura | H04W 76/28 455/450 |
| 2012/0040620 | A1* | 2/2012 | Fu | H04B 1/1027 455/63.1 |
| 2012/0320810 | A1 | 12/2012 | Nourbakhsh | |
| 2014/0105085 | A1* | 4/2014 | Hu | H04W 52/0225 370/311 |
| 2015/0305084 | A1* | 10/2015 | Ji | H04W 52/0216 370/311 |
| 2015/0334771 | A1* | 11/2015 | Li | H04W 28/0205 455/452.1 |
| 2016/0050587 | A1* | 2/2016 | Lam | H04W 28/08 370/235 |
| 2016/0088681 | A1* | 3/2016 | Chang | H04W 52/0216 455/405 |
| 2016/0285614 | A1* | 9/2016 | Lee | H04L 5/22 |
| 2016/0286604 | A1* | 9/2016 | Heo | H04W 52/54 |

* cited by examiner

DEVICE IN WIRELESS COMMUNICATION SYSTEM AND METHOD

FIELD

The present disclosure generally relates to the field of wireless communication technology, and in particular to a device and a method in a wireless communication system, which is capable of coordinating a periodic discontinuous transmission (DTX) mode on a cell side with a periodic discontinuous reception (DRX) mode on a user equipment side. Each one period of the periodic discontinuous transmission mode includes an activation time duration and a sleeping time duration, and the cell provides a service to the user equipment during the activation time duration.

BACKGROUND

With rapid developments of network coverage and data requirement, a scale of a mobile network is expanded increasingly, and the number of network equipment, base stations and power systems is increased in multiples, and therefore an issue of power consumption in a wireless communication network has become a focus in the industry. The base station in a cell is a main power-consumption device in the wireless communication network, and the number of base stations may be increased rapidly as the number of users and communication capacity in a cellular communication system are increased increasingly. Therefore, a key to realize green communication is to reduce the power consumption of the base station.

In order to save energy on a base station side, as a DRX mechanism on a terminal side, dynamic on/off can be performed on the base station side based on an actual capacity requirement, thereby reasonably allocating power consumption and achieving an object of energy saving. The content described above has been discussed in small cell enhancements of RAN1 of 3GPP, i.e. small cell on/off.

In the discussion of 3GPP, the small cell on/off can be implemented in many ways, for example, based on data packet arrival and user arrival and the like. However, since the data packet arrival and the user arrival are random, time points when a small cell determines to switch on/off are random in this case. Therefore, sleeping of the small cell may result in performance loss for a traditional user, and a length of time during which the small cell is switched on/off may further affect performance of the on/off mechanism.

The DRX mechanism provides a balance between power consumption and quick response for the user. With the DRX mechanism, the user only monitors a control channel periodically, and burst of data is addressed by an inactivity timer or by setting a shorter DRX timer. In the traditional DRX mechanism, the cell is deemed to be always on by default, but in a scenario under which the small cell may enter a sleeping state, the on/off state of the cell is uncertain at a certain time point. If a terminal in an activation time duration of the DRX mode desires to receive data from a cell while the cell is in the sleeping time duration at this time, it is impossible to achieve desired communication. Therefore, it is required to coordinate the on/off on the cell side and the DRX mode on the terminal side.

SUMMARY

A brief summary of the disclosure will be given below to provide basic understanding of some aspects of the disclosure. However, it shall be appreciated that this summary is neither exhaustively descriptive of the disclosure nor intended to define essential or important parts or the scope of the disclosure but is merely for the purpose of presenting some concepts of the disclosure in a simplified form and hereby acts as a preamble of more detailed descriptions which will be presented later.

In view of the above problem, one of objects of the present disclosure is to provide a method for coordinating an on/off on a cell side with discontinuous reception on a user equipment side, aiming to save power consumption of a system as much as possible while ensuring service performance for a user. Specifically, a periodic sleeping strategy, i.e. a periodic discontinuous transmission (DTX) mode, may be configured on the cell side. Similar to a periodic DRX mechanism on the user side, if a constant on/off period is configured for the DTX mechanism on the cell side, it is possible to support a traditional user by setting a DRX period of a user equipment within the cell to be compatible with a DTX period of the cell. In addition, the user equipment can prepare in advance before communication on the premise of acquiring the DTX period of the cell, thereby reducing time for switching on/off of the cell.

According to an aspect of the present disclosure, there is provided a device in a wireless communication system. The device may include a cell configuring unit configured to control a periodic discontinuous transmission mode of a cell and configure a parameter, comprising a period, of the periodic discontinuous transmission mode, according to a load condition of the cell and/or an inter-cell interference condition; and a user equipment configuring unit configured to configure, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

According to a preferred embodiment of the present disclosure, the cell configuring unit may be further configured to configure at least one of a start time point, a length of the period, a length of the activation time duration and/or a length of the sleeping time duration, of the periodic discontinuous transmission mode, and the user equipment configuring unit may be further configured to configure at least one of a start time point, a length of the period, a length of an activation time duration and/or a length of a sleeping time duration, of the periodic discontinuous reception mode.

According to another preferred embodiment of the present disclosure, the cell configuring unit may be further configured to configure so that the greater a load is, the shorter the period of the periodic discontinuous transmission mode is and/or the longer the activation time duration of the periodic discontinuous transmission mode is, and the smaller the load is, the longer the period of the periodic discontinuous transmission mode is and/or the shorter the activation time duration of the periodic discontinuous transmission mode is, and the user equipment configuring unit may be further configured to configure so that the shorter the period of the periodic discontinuous transmission mode is, the shorter the period of the periodic discontinuous reception mode is, and the longer the period of the periodic discontinuous transmission mode is, the longer the period of the periodic discontinuous reception mode is.

According to another preferred embodiment of the present disclosure, the user equipment configuring unit may be further configured to configure the period of the periodic discontinuous reception mode of the user equipment, so that when the periodic discontinuous reception mode of the user equipment is in an activation time duration, the periodic discontinuous transmission mode of the cell is also in the activation time duration, and the period of the periodic discontinuous reception mode is an integer multiple of the period of the periodic discontinuous transmission mode.

According to another preferred embodiment of the present disclosure, the device in the wireless communication system may further include a grouping unit configured to group the user equipment, so that periods of periodic discontinuous reception modes of user equipment in a same group keep aligned with each other, and activation time durations of periodic discontinuous reception modes of user equipment in different groups are offset from each other.

According to another preferred embodiment of the present disclosure, the device in the wireless communication system may further include an allocating unit configured to allocate the activation time duration in one period of the periodic discontinuous transmission mode of the cell according to grouping of the user equipment, so that different activation time durations are allocated to different groups of user equipment. The user equipment configuring unit may be further configured to configure, according to the activation time duration allocated to the user equipment, so that the activation time duration within one period of the periodic discontinuous reception mode of the user equipment matches with the activation time duration allocated to the user equipment.

According to another preferred embodiment of the present disclosure, the allocating unit may be further configured to set, in a case that there is only one activation time duration within one period of the periodic discontinuous transmission mode of the cell, different activation time duration offsets for different groups of user equipment, and allocate, in a case that there are a plurality of activation time durations within one period of the periodic discontinuous transmission mode of the cell, different activation time durations of the plurality of activation time durations to different groups of user equipment.

According to another preferred embodiment of the present disclosure, the device in the wireless communication system may further include a sub periodic discontinuous transmission mode configuring unit configured to configure a sub periodic discontinuous transmission mode for the cell, and to make a period of a sub periodic discontinuous reception mode of the user equipment be aligned with a period of the sub periodic discontinuous transmission mode, in a case that a communication requirement of the user equipment is not met in the activation time duration within one period of the periodic discontinuous transmission mode.

According to another preferred embodiment of the present disclosure, the allocating unit may be further configured to allocate, in a case that a service with high real-time performance and/or a large data transfer amount arrives at the user equipment and a currently configured periodic discontinuous transmission mode does not meet a current service requirement of the user equipment after the periodic discontinuous transmission mode of the cell has been switched on, the activation time durations for one or more groups of user equipment within one period of the periodic discontinuous transmission mode of the cell to the user equipment to serve the user equipment.

According to another preferred embodiment of the present disclosure, the device in the wireless communication system may further include a serving unit configured to offload a service of the user equipment to a cell in which the periodic discontinuous transmission mode is not switched on, or to utilize, if the user equipment is capable of supporting carrier aggregation and/or dual connection, activation time durations within periods of the periodic discontinuous transmission modes of different cells to serve the user equipment in coordination, in a case that the cell cannot support the service.

According to another preferred embodiment of the present disclosure, the cell configuring unit may be further configured to switch off the periodic discontinuous transmission mode of the cell in a case that an average load condition of the cell within a predetermined time duration is higher than a predetermined threshold and/or in a case that a service of certain user equipment within the cell can not be implemented in the periodic discontinuous transmission mode.

According to another preferred embodiment of the present disclosure, the cell configuring unit may be further configured to configure a ratio of the activation time duration to the sleeping time duration within one period of the periodic discontinuous transmission mode of the cell to be close to a current resource utilization rate of the cell.

According to another preferred embodiment of the present disclosure, the device in the wireless communication system may further include an interacting unit configured to enable the cell to interact with a neighboring interfering cell information about parameters of respective periodic discontinuous transmission modes. The cell configuring unit may be further configured to make, according to the interacted information about the parameters, the activation time duration within the period of the periodic discontinuous transmission mode of the cell be spaced apart from the activation time duration within the period of the periodic discontinuous transmission mode of the neighboring interfering cell.

According to another preferred embodiment of the present disclosure, the cell described above is a small cell.

According to another aspect of the present disclosure, there is also provided a device in a wireless communication system. The device may include a receiving unit configured to receive from a cell a configuration signaling regarding a periodic discontinuous reception mode; and a configuring unit configured to configure the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

According to a preferred embodiment of the present disclosure, when the periodic discontinuous reception mode of the user equipment is in an activation time duration, the periodic discontinuous transmission mode of the cell is also in the activation time duration, and the period of the periodic discontinuous reception mode is an integer multiple of the period of the periodic discontinuous transmission mode.

According to another aspect of the present disclosure, there is also provided a method in a wireless communication system. The method may include a cell configuring step of controlling a periodic discontinuous transmission mode of a cell and configuring a parameter, comprising a period, of the periodic discontinuous transmission mode, according to a load condition of the cell and/or an inter-cell interference condition; and a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

According to another aspect of the present disclosure, there is also provided a method in a wireless communication system. The method may include a receiving step of receiving from a cell a configuration signaling regarding a periodic discontinuous reception mode; and a configuring step of configuring the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

According to another aspect of the present disclosure, there is also provided a device in a wireless communication system. The device may include a cell configuring unit configured to control a periodic discontinuous transmission mode of a cell and configure a parameter, comprising a period, of the periodic discontinuous transmission mode, according to a load condition of the cell and/or an inter-cell interference condition. The cell configuring unit further includes: a determining module configured to determine whether to switch on the periodic discontinuous transmission mode of the cell based on the load condition of the cell and/or the inter-cell interference condition; and a parameter configuring module configured to configure, in response to determining to switch on the periodic discontinuous transmission mode by the determining module, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which the determining module determines to switch on the periodic discontinuous transmission mode of the cell in a case that the load condition of the cell is less than a first predetermined threshold and/or the inter-cell interference condition is greater than a second predetermined threshold.

According to another aspect of the present disclosure, there is also provided a method in a wireless communication system. The method may include a cell configuring step of controlling a periodic discontinuous transmission mode of a cell and configuring a parameter, comprising a period, of the periodic discontinuous transmission mode, according to a load condition of the cell and/or an inter-cell interference condition. The cell configuring step further includes: a determining step of determining whether to switch on the periodic discontinuous transmission mode of the cell based on the load condition of the cell and/or the inter-cell interference condition; and a parameter configuring step of configuring, in response to determining to switch on the periodic discontinuous transmission mode in the determining step, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which it is determined in the determining step to switch on the periodic discontinuous transmission mode of the cell in a case that the load condition of the cell is less than a first predetermined threshold and/or the inter-cell interference condition is greater than a second predetermined threshold.

According to another aspect of the present disclosure, there is also provided a device, which is arranged in a wireless communication system and may include a circuit configured to perform: a cell configuring step of controlling a periodic discontinuous transmission mode of a cell and configuring a parameter, comprising a period, of the periodic discontinuous transmission mode, according to a load condition of the cell and/or an inter-cell interference condition; and a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

According to another aspect of the present disclosure, there is also provided a device, which is arranged in a wireless communication system and may include a circuit configured to perform: a receiving step of receiving from a cell a configuration signaling regarding a periodic discontinuous reception mode; and a configuring step of configuring the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

According to another aspect of the present disclosure, there is also provided a device, which is arranged in a wireless communication system and may include a circuit configured to perform: a cell configuring step of controlling a periodic discontinuous transmission mode of a cell and configuring a parameter, comprising a period, of the periodic discontinuous transmission mode, according to a load condition of the cell and/or an inter-cell interference condition. The cell configuring step further includes: a determining step of determining whether to switch on the periodic discontinuous transmission mode of the cell based on the load condition of the cell and/or the inter-cell interference condition; and a parameter configuring step of configuring, in response to determining to switch on the periodic discontinuous transmission mode in the determining step, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which it is determined in the determining step to switch on the periodic discontinuous transmission mode of the cell in a case that the load condition of the cell is less than a first predetermined threshold and/or the inter-cell interference condition is greater than a second predetermined threshold.

According to another aspect of the present disclosure, there is also provided a storage medium including machine-readable program codes which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition; and a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

According to another aspect of the present disclosure, there is also provided a program product including machine-executable instructions which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition; and a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

According to another aspect of the present disclosure, there is also provided a storage medium including machine-readable program codes which, when executed on an information processing device, cause the information processing device to perform: a receiving step of receiving from a cell a configuration signaling regarding a periodic discontinuous reception mode; and a configuring step of configuring the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

According to another aspect of the present disclosure, there is also provided a program product including machine-executable instructions which, when executed on an information processing device, cause the information processing device to perform: a receiving step of receiving from a cell a configuration signaling regarding a periodic discontinuous reception mode; and a configuring step of configuring the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

According to another aspect of the present disclosure, there is also provided a storage medium including machine-readable program codes which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition. The cell configuring step further includes: a determining step of determining whether to switch on the periodic discontinuous transmission mode of the cell based on the load condition of the cell and/or the inter-cell interference condition; and a parameter configuring step of configuring, in response to determining to switch on the periodic discontinuous transmission mode in the determining step, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which it is determined in the determining step to switch on the periodic discontinuous transmission mode of the cell in a case that the load condition of the cell is less than a first predetermined threshold and/or the inter-cell interference condition is greater than a second predetermined threshold.

According to another aspect of the present disclosure, there is also provided a program product including machine-executable instructions which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition. The cell configuring step further includes: a determining step of determining whether to switch on the periodic discontinuous transmission mode of the cell based on the load condition of the cell and/or the inter-cell interference condition; and a parameter configuring step of configuring, in response to determining to switch on the periodic discontinuous transmission mode in the determining step, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which it is determined in the determining step to switch on the periodic discontinuous transmission mode of the cell in a case that the load condition of the cell is less than a first predetermined threshold and/or the inter-cell interference condition is greater than a second predetermined threshold.

It should be noted that, in some examples in the specification, a cell may be any apparatus having a function of a base station, including a traditional base station, a small base station, a relay node or user equipment serving as a base station and the like.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
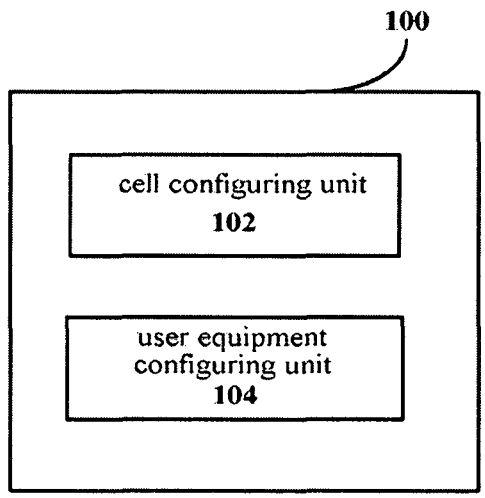
FIG. 1 is a block diagram showing a function configuration example of a device in a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

The embodiments of the present disclosure are described below with reference to FIG. 1 to FIG. 11.

Firstly, a function configuration example of a device in a wireless communication system according to an embodiment of the present disclosure will be described with reference to FIG. 1. FIG. 1 is a block diagram showing a function configuration example of a device in a wireless communication system according to an embodiment of the present disclosure.

As shown in FIG. 1, a device 100 in the wireless communication system according to the embodiment may include a cell configuring unit 102 and a user equipment configuring unit 104. A function configuration example of each of the cell configuring unit 102 and the user equipment configuring unit 104 is described in detail below.

The cell configuring unit 102 may be configured to control a periodic discontinuous transmission mode of a cell and configure a parameter, including a period, of the periodic discontinuous transmission mode, according to a load condition of the cell and/or an inter-cell interference condition. Each one period of the periodic discontinuous transmission mode includes an activation time duration and a sleeping time duration, and the cell provides a service to the user equipment during the activation time duration.

It should be understood that, during the sleeping time duration, as in the small cell on/off, when a cell is switched off, for the purpose of energy saving, most of radio frequency functions of the cell may be switched off so that a reference signal such as a reference signal for cell measurement (for example a cell reference signal (CRS), a channel state information reference signal (CSI-RS) or the like) or a reference signal for data demodulation (for example, a demodulation reference signal (DMRS) or the like), by which normal communication of the user equipment can be ensured, is no longer transmitted. However, in order that the user can discover such cell, a dedicated cell discovery reference signal (DRS) may be introduced in future standards, and the cell discovery reference signal is constantly transmitted even during the sleeping time duration (i.e. during a time duration when the cell is switched off).

It should be noted that, corresponding to the DRX mode on the user equipment side, a DTX mode is used for the cell side. In the present disclosure, since a period of the DRX mode is compliant with a period of the DTX mode (such as the period of the DRX mode is an integer multiple of the period of the DTX mode), no communication is performed in the sleeping time duration of the DTX mode, and thus it is unnecessary to transmit and receive uplink or downlink data. The DTX mode is a concept proposed based on the small cell on/off. Therefore, in some examples, a behavior of the cell during the sleeping time duration may conform to a behavior defined in the small cell on/off. In addition, the cell side may determine, based on a size of a data block to be transmitted of the user equipment before a timer expires, whether to extend the activation time duration in a current period of the DTX mode, and thus it is possible to extend the activation time duration in the DTX mode after a current transmission is completed. Alternatively, it can be determined not to extend (e.g. no extension mechanism is provided) the activation time duration in the DTX mode and to transmit the data block in a next period.

It should be understood that, generally, a sleeping strategy of the cell is mainly applied to a dense deployment region. Therefore, the main object for configuring the periodic DTX mode on the cell side lies in: (1) saving energy consumption and improving a resource utilization rate: dense cell deployment aims at meeting a transmission service of large data amount in a hot spot region, however, due to a time-varying property of the amount of data traffic and non-uniformity of a traffic distribution, the number of users in the dense cell may be reduced at some time instants, and meanwhile a requirement of data service is low. In this case, it is no need for the cell to constantly serve the users. Therefore, the cell having small load may be switched off at some time instants, in order to save network energy consumption and improve the resource utilization rate; and (2) coordinating inter-cell interference: since geographical positions of cells are close to each other and signal attenuation between the cells is small in the dense deployment region, a cell may suffer severe interference from a neighboring cell, resulting in reduction in the resource utilization rate of the cell. Therefore, a neighboring cell severely interfering with the cell may be switched off temporarily to ensure a service quality for the user equipment and reduce the inter-cell interference. Alternatively, the cell may interact with the neighboring cell information about whether the DTX mode can be supported. In a case that the neighboring cell can be switched off (e.g. supports the DTX mode), it may be configured that an activation time duration in a period of the DTX mode of the current cell is staggered with respect to an activation time duration in a period of the DTX mode in a neighboring cell to avoid the interference. Alternatively, in a case that the neighboring cell can not be switched off (e.g. does not support the DTX mode), it may be configured that the DTX mode of the current cell is in the sleeping time duration if the interference from the neighboring cell is large, and the DTX mode of the current cell is in the activation time duration if the interference from the neighboring cell is small.

Therefore, preferably, the device 100 may further include an interacting unit. The interacting unit may be configured to enable the cell to interact with a neighboring interfering cell information about parameters of respective periodic discontinuous transmission modes. The cell configuring unit may be further configured to make, according to the interacted information about the parameters, the activation time duration in the period of the periodic discontinuous transmission mode of the cell be spaced apart from the activation time duration in the period of the periodic discontinuous transmission mode of the neighboring interfering cell.

Preferably, the cell configuring unit 102 may configure, according to the load condition of the cell and/or the inter-cell interference condition, at least one of a start time point, a length of the period, a length of the activation time duration and/or a length of the sleeping time duration, of the periodic discontinuous transmission mode of the cell.

In addition, preferably, the cell configuring unit 102 may configure so that the greater a load is, the shorter the period of the periodic discontinuous transmission mode is and/or the longer the activation time duration of the periodic discontinuous transmission mode is, and the smaller the load is, the longer the period of the periodic discontinuous transmission mode is and/or the shorter the activation time duration of the periodic discontinuous transmission mode is.

Specifically, in a case of configuring according to the load condition of the cell, the cell configuring unit 102 may be configured to calculate a resource utilization rate within a coverage range of the cell in a time window of a predetermined length, switch on a periodic DTX mode of the cell to save power consumption if the resource utilization rate is less than a predetermined threshold, and set the period (i.e. a DTX period) of the periodic DTX mode according to the resource utilization rate. Preferably, the cell configuring unit 102 may configure the period of the periodic DTX mode of the cell, so that a ratio of the activation time duration (i.e. ON duration) to the sleeping time duration (i.e. OFF duration) in one period is approximately maintained at a current resource utilization rate of the cell. It should be noted that, since the resource utilization rate within the cell herein is a result of averaging for a long time duration, the load condition of the cell may not be changed significantly in view of a large time scale. Although the cell may change adaptively based on a current communication situation, generally speaking, the ratio of the activation time duration to the sleeping time duration in one period of the DTX mode of the cell may be maintained at the current ratio approximately. However, in a case that the load change is accumulated for a long time duration, the cell may adjust the DTX period and inform the user equipment in the coverage range thereof in a manner of system broadcasting.

Furthermore, in a case of configuring based on the inter-cell interference condition, the cell configuring unit 102 may further acquire interference information of a neighboring cell through measurement report by the user equipment, switch on the periodic DTX mode of the cell if most of the user equipment within the cell simultaneously report that high interferences are measured, and configure the DTX period by coordinating with the neighboring interfering cell. Specifically, the cell configuring unit 102 may be configured to make, if a large interference exists between two cells, the activation time durations in the DTX periods of the two cells be spaced apart from each other in time, thereby reducing the inter-cell interference and improving a system throughput.

It should be understood that, the cell configuring unit 102 may configure the periodic DTX mode of the cell by considering the load condition of the cell and the inter-cell interference condition at the same, thereby saving power consumption while reducing the inter-cell interference.

In another aspect, in a case that an average load condition of the cell within the time window of the predetermined length is greater than the predetermined threshold or in a case that services of some user equipment within the cell can not be implemented in the periodic DTX mode, the cell configuring unit 102 may switch off the periodic DTX mode of the cell to maintain the cell to be operated in a normally on state and thus provide required services for the user equipment.

In addition, it is known that in a DRX mode of the user equipment, the user equipment in an idle state (e.g. RRC IDLE state) needs to detect a paging sub-frame on a specific sub-frame, so as to ensure that the user equipment per se can be paged. Therefore, when configuring the activation time duration in the DTX mode based on existing communication standards, it also needs to take such factor into consideration so that the cell is kept on in a time slot of the paging sub-frame.

The user equipment configuring unit 104 may be configured to configure a parameter, including a period, of a periodic discontinuous reception mode of the user equipment according to the parameter of the periodic discontinuous transmission mode, so that the period of the periodic discontinuous reception mode of the user equipment is compatible with the period of the periodic discontinuous transmission mode.

Preferably, the user configuring unit 104 may configure the parameter related to the periodic DRX mode of the user equipment based on the configuration of the periodic DTX mode on the cell side, so that when the periodic discontinuous reception mode of the user equipment is in the activation time duration, the periodic discontinuous transmission mode of the cell is also in the activation time duration, and the period of the periodic discontinuous reception mode is an integer multiple of the period of the periodic discontinuous transmission mode to ensure compatibility. In addition, the user equipment configuring unit 104 may be further configured to keep DRX configurations for multiple user equipment within the cell to be aligned with each other as much as possible (that is, the start time points of the activation time durations in the DRX periods of the respective user equipment are kept consistence) to facilitate scheduling.

Preferably, the user equipment configuring unit 104 may configure at least one of a start time point, a length of the period, a length of the activation time duration and/or a length of the sleeping time duration, of the periodic discontinuous transmission mode. In addition, preferably, similar to the configuration of the periodic DTX mode on the cell side, the user equipment configuring unit 104 may configure so that the shorter the period of the periodic discontinuous transmission mode is, the shorter the period of the periodic discontinuous reception mode is, and the longer the period of the periodic discontinuous transmission mode is, the longer the period of the periodic discontinuous reception mode is.

It should be understood that, the period of the periodic DRX mode is highly related to the period of the periodic DTX mode, but the activation time duration in the period of the periodic DRX mode is not necessarily directly related to the activation time duration in the period of the periodic DTX mode. This is because the activation time duration in the period of the periodic DTX mode is also related to the number of groups of the user equipment supported by the cell, the more the groups are, the shorter the activation time duration allocated to each group of the user equipment is.

It can be seen from the above description that, in a case that the cell configuring unit 102 configures the periodic DTX mode of the cell and the user equipment configuring unit 104 configures the periodic DRX mode of the user equipment, coordination between the periodic discontinuous transmission mode on the cell side and the periodic discontinuous reception mode on the user equipment side can be implemented, thereby reducing power consumption of the system as much as possible while ensuring a service quality for the user equipment.

However, if all user equipment within the cell simultaneously enter into an activation state from a sleeping state, some of the user equipment can not be scheduled immediately. To address the problem, the present disclosure provides a solution as follows. The solution is described below in detail with reference to FIG. 2.

Figure 2:
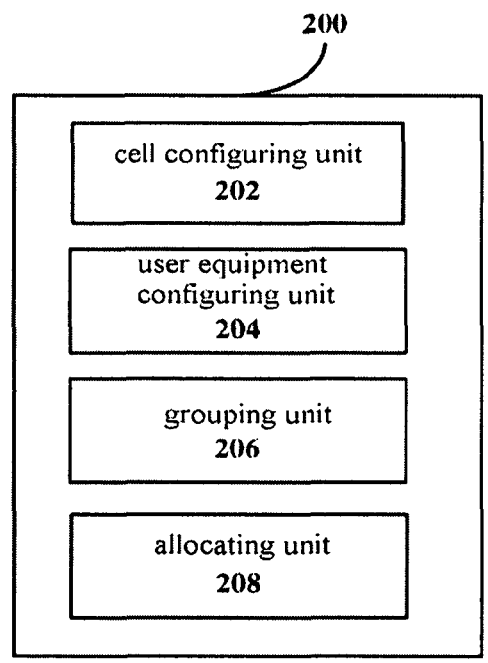
FIG. 2 is a block diagram showing a function configuration example of a device in a wireless communication system according to another embodiment of the present disclosure.

FIG. 2 is a block diagram showing a function configuration example of a device in a wireless communication system according to another embodiment of the present disclosure.

As shown in FIG. 2, a device 200 in the wireless communication system according to the embodiment may include a cell configuring unit 202, a user equipment configuring unit 204, a grouping unit 206 and an allocating unit 208. Function configurations of the cell configuring unit 202 and the user equipment configuring unit 204 are the same as the function configurations of the cell configuring unit 102 and the user equipment configuring unit 104 described above with reference to FIG. 1 respectively, and are not described repeatedly here. Only function configuration examples of the grouping unit 206 and the allocating unit 208 are described in detail below.

The grouping unit 206 may be configured to group the user equipment, so that periods of periodic discontinuous reception modes of user equipment in a same group keep aligned with each other, and activation time durations of periodic discontinuous reception modes of user equipment in different groups are offset from each other. An object of divide the user equipment into different DTX/DRX groups is to perform resource allocation and scheduling in time.

Figure 3:
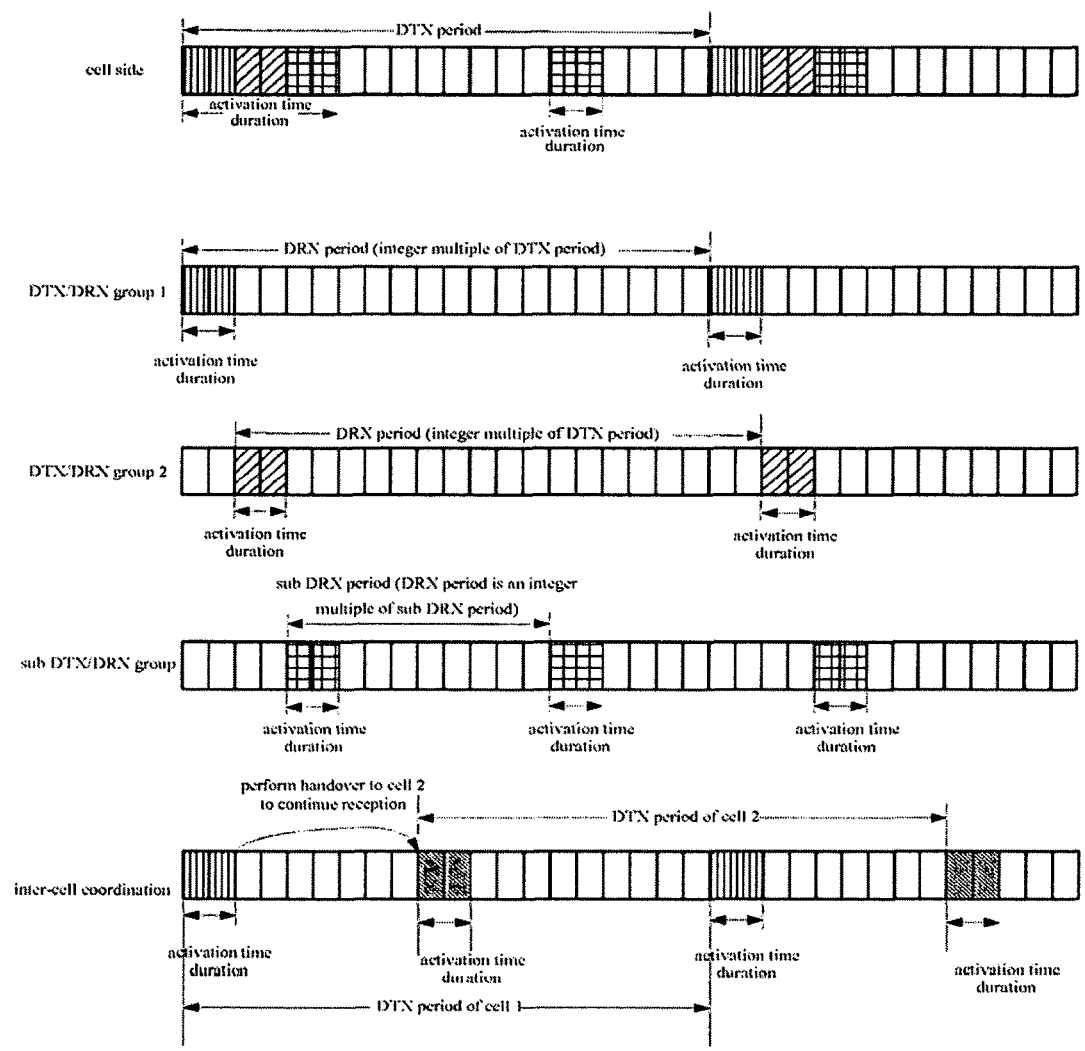
FIG. 3 is a schematic diagram showing exemplary configurations of a periodic discontinuous transmission mode and a periodic discontinuous reception mode.

Reference is made to FIG. 3 which is a schematic diagram showing exemplary configurations of a periodic DTX mode and a periodic DRX mode. As shown in FIG. 3, in the example, user equipment are grouped into a DTX/DRX group 1 and a DTX/DRX group 2, where activation time durations of the user equipment in the two groups are offset from each other.

The allocating unit 208 may be configured to allocate the activation time durations in one period in the periodic discontinuous transmission mode of the cell based on the grouping of the user equipment, so that different activation time durations are allocated to different groups of user equipment.

Preferably, the allocating unit 208 may be configured to set, in a case that there is only one activation time duration in one period of the periodic discontinuous transmission mode of the cell, different activation time duration offsets for different groups of user equipment, and to allocate, in a case that there are multiple activation time durations in one period of the periodic discontinuous transmission mode of the cell, different activation time durations of the multiple activation time durations to different groups of user equipment. Generally, the cell only schedules, in an activation time duration, user equipment in a group corresponding to the activation time duration to receive a downlink signal in the activation time duration, so as to balance traffic in different time durations.

In addition, preferably, the user equipment configuring unit 204 may configure according to the activation time duration allocated to the user equipment, so that the activation time duration within one period of the periodic discontinuous reception mode of the user equipment matches with the activation time duration allocated to the user equipment.

As shown in FIG. 3, the activation time duration in the DRX period of the DTX/DRX group 1 corresponds to a vertical-line shaded portion of the activation time duration in the DTX period, and the activation time duration in the DRX period of the DTX/DRX group 2 corresponds to an oblique-line shaded portion of the activation time duration in the DTX period.

Further, preferably, the allocating unit 208 may be further configured to allocate, in a case that a service with high real-time performance and/or a large data transfer amount arrives at the user equipment and a currently configured periodic discontinuous transmission mode can not meet a current service requirement of the user equipment after the periodic discontinuous transmission mode of the cell has been switched on, the activation time durations for one or more groups of user equipment within one period of the periodic discontinuous transmission mode of the cell to the user equipment to serve the user equipment. For example, as shown in FIG. 3, in a case the service with high real-time performance and/or a large data transfer amount arrives at certain user equipment in group 1, the activation time durations in the DTX period allocated to the user equipment in group 2 may be allocated to the user equipment to deal with a burst situation. For example, the cell schedules the user equipment in group 1 in the activation time duration in the DRX period of the user equipment in group 1, so that the user equipment in group 1 receives downlink signals in a time duration beyond the activation time duration in the DRX period thereof (e.g. in the activation time duration allocated to group 2). That is to say, in a case that a specified condition is met, the cell also communicates with the user equipment in group 1 in the activation time duration allocated to the user equipment in group 2.

Here, it should be noted that, although in the embodiment the cell groups the user equipment and informs the user equipment of the grouping result, the user equipment may be grouped randomly. For example, the user equipment may be grouped based on international mobile subscriber identification number (IMSI) thereof according to a predetermined rule. In this case, the grouping unit 206 is not required.

Besides, if a certain user has a short-time burst service with a large data amount, data may not be transmitted completely in a single DTX period. For such a problem, a solution is further provided below in the present disclosure. The solution is described below in detail with reference to FIG. 4.

Figure 4:
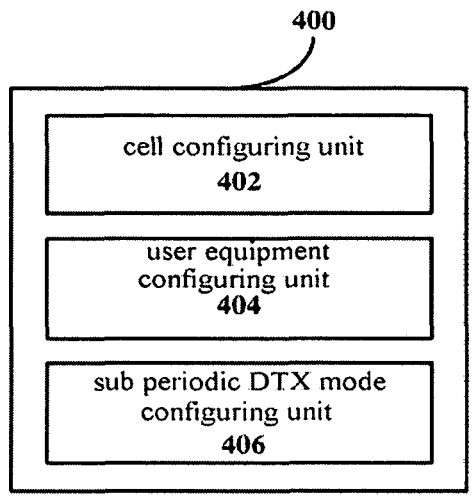
FIG. 4 is a block diagram showing a function configuration example of a device in a wireless communication system according to another embodiment of the present disclosure.

FIG. 4 is a block diagram showing a function configuration example of a device in a wireless communication system according to another embodiment of the present disclosure.

As shown in FIG. 4, a device 400 in the wireless communication system according to the embodiment may include a cell configuring unit 402, a user equipment configuring unit 404 and a sub periodic discontinuous transmission mode configuring unit 406. Function configurations of the cell configuring unit 402 and the user equipment configuring unit 404 are the same as the function configurations of the cell configuring unit 102 and the user equipment configuring unit 104 described above with reference to FIG. 1, and are not described repeatedly here. Only a function configuration example of the sub periodic discontinuous transmission mode configuring unit 406 is described below in detail.

The sub periodic discontinuous transmission mode configuring unit 406 may be configured to configure a sub periodic discontinuous transmission mode for the cell, and to make a period of a sub periodic discontinuous reception mode of the user equipment be aligned with a period of the sub periodic discontinuous transmission mode, in a case that a communication requirement of the user equipment can not be met in the activation time duration within one period of the periodic discontinuous transmission mode.

Specifically, in a case that a short-time burst service with a large data amount arrives at some user equipment and thus the data can not be transmitted completely in the activation time duration in a single DTX period, since the load condition within the cell is not heavy and it is unnecessary to switch off the periodic DTX mode due to only these user equipment, a sub periodic DTX mode, in which one or more activation time durations are set in the original sleeping time duration within the period of the periodic DTX mode of the cell so that the cell is switched on in the one or more activation time durations to dedicatedly provide a service to these user equipment, may be configured for these user equipment. Correspondingly, a sub periodic DRX mode is configured on the user equipment side, and the activation time duration in the sub periodic DRX mode is aligned with the activation time duration of the sub periodic DTX mode. The configuration of the sub periodic DTX mode is shown in FIG. 3, as indicated by a sub DTX/DRX group.

It should be understood that, the DRX period is an integer multiple of the DTX period, and the DRX period is also an integer multiple of the sub DRX period. In the example shown in FIG. 3, the DRX period is one time of the DTX period, and is two times of the sub DRX period. Other feasible solutions may be devised by those skilled in the art based on the schematic diagram.

Based on the DTX/DRX grouping setting described with reference to FIG. 2 and the sub periodic DTX mode setting described with reference to FIG. 4 in the above, activation time durations within one DTX period of the cell may be allocated, thereby reducing power consumption as much as possible while ensuring normal communications of all user equipment.

It is assumed that a service having a high real-time performance, such as Voice over Internet Protocol (VOIP) service, arrives at the user equipment after the periodic DTX mode is configured on the cell side and the periodic DRX mode is configured on the user equipment side, and a time span between adjacent data packages is shorter than the DTX period, it is firstly attempted to utilize multiple DTX/DRX groups to serve the user equipment, or configure a sub periodic DTX for the user equipment dedicatedly. In a case that the cell still can not well support service transmissions of some special user equipment within the cell, the cell may also try to shorten the DTX period and notify the user equipment to change their DRX configurations, or quit the periodic DTX mode to serve these special user equipment. It should be understood that, the DTX period before shortening should be an integer multiple of the shortened DTX period.

In addition, for some services having a large data transmission amount such as a video downloading service, transmission of data arrived within a previous DTX period can not be completed in the activation time duration in one DTX period. In this case, the activation time duration in the DTX period may be extended, or the problem may be addressed by the method described above.

Figure 5:
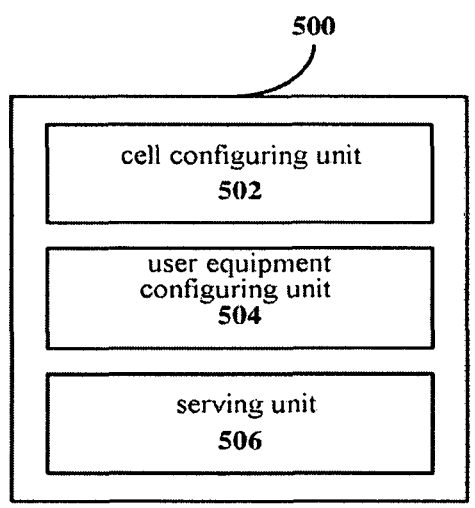
FIG. 5 is a block diagram showing a function configuration example of a device in a wireless communication system according to another embodiment of the present disclosure.

FIG. 5 is a block diagram showing a function configuration example of a device in a wireless communication system according to another embodiment of the present disclosure.

As shown in FIG. 5, a device 500 in the wireless communication system according to the embodiment may include a cell configuring unit 502, a user equipment configuring unit 504 and a serving unit 506. Function configurations of the cell configuring unit 502 and the user equipment configuring unit 504 are the same as the function configurations of the cell configuring unit 102 and the user equipment configuring unit 104 described with reference to FIG. 1, and are not described repeatedly here. Only a function configuration example of the serving unit 506 is described in detail below.

The serving unit 506 may be configured to offload a service of the user equipment to a cell in which the periodic discontinuous transmission mode is not switched on, or utilize, if the user equipment is capable of supporting carrier aggregation and/or dual connection, activation time durations within periods of the periodic discontinuous transmission modes of different cells to serve the user equipment, in a case that the cell can not support the service.

Specifically, for example, in a case the periodic DTX mechanism of the cell can not support transmission of a large amount of data of the user equipment, the cell may offload the service of the user equipment to another cell such as a macro cell in which the periodic DTX mechanism is not switched on. In addition, in a case that the user equipment is capable of supporting carrier aggregation (CA-capable) and/or dual connection (dual-connectivity-capable), and the periodic DTX mode of a neighboring cell is also switched on and the activation time durations of the DTX modes of the two cells do not overlap with each other, inter-cell coordinated transmission may be performed.

The inter-cell coordinated transmission mainly aims at a case in which adjacent cells each are in the periodic DTX mode and the user equipment is CA-capable or dual-connectivity-capable. In this case, if the user equipment has a time-delay sensitive service or a short-time service having large data amount to be transmitted, activation time durations within the DTX periods of different cells may be utilized to perform data communication so as to serve the user equipment, as shown at the bottom of FIG. 3.

In this case, preferably, the device 500 may further include an interacting unit. Thereby, parameters related to the periodic DTX mode of the neighboring cell are acquired via the interacting unit. Then, the activation time duration of the current cell may be set based on the parameters, so that the activation time duration of the current cell and the activation time duration of the neighboring cell are staggered (or interleaved) without a gap. Thus, once the current cell enters into the sleeping state, the user equipment served by the current cell may be immediately transferred to be served by the neighboring cell.

In the embodiments of the present disclosure, the cell mainly refers to a small cell, including for example a micro cell, a femto cell and the like, since the DTX/DRX schemes according to the present disclosure are generally performed in a region where small cells are deployed densely.

It should be noted that, the device described above with reference to FIGS. 1 to 5 may be a base station within the cell, and may be arranged in the base station within the cell or may be arranged separately from the base station, which is not limited in the present disclosure.

Next, a function configuration example of the device in a wireless communication system according to an embodiment of the present disclosure is described with reference to FIG. 6. It can be understood that the device corresponds to a device on the user equipment side.

Figure 6:
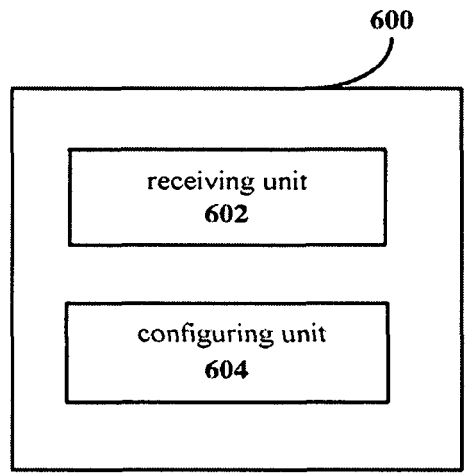
FIG. 6 is a block diagram showing a function configuration example of a device in a wireless communication system according to an embodiment of the present disclosure.

FIG. 6 is a block diagram showing a function configuration example of a device in a wireless communication system according to an embodiment of the present disclosure.

As shown in FIG. 6, a device 600 in the wireless communication system according to the embodiment may include a receiving unit 602 and a configuring unit 604. Function configuration examples of the receiving unit 602 and the configuring unit 604 are described below in detail.

The receiving unit 602 may be configured to receive from a cell a configuration signaling regarding a periodic discontinuous reception mode. As described above, the configuration signaling may include at least one of a start time point, a length of a period, a length of an activation time duration and/or a length of a sleeping time duration, of the periodic DRX mode.

The configuring unit 604 may be configured to configure the periodic discontinuous reception mode of the user equipment according to the received configuration signaling. Preferably, the period of the periodic discontinuous reception mode of the user equipment is compatible with the period of the periodic discontinuous transmission mode of the cell, each one period of the periodic discontinuous transmission mode may include an activation time duration and a sleeping time duration, and the cell provides a service to the user equipment in the activation time duration.

Preferably, when the periodic discontinuous reception mode of the user equipment is in the activation time duration, the periodic discontinuous transmission mode of the cell is also in the activation time duration, and the period of the periodic discontinuous reception mode is an integer multiple of the period of the periodic discontinuous transmission mode.

In the embodiment of the present disclosure, coordination between the periodic DTX mechanism on the cell side and the periodic DRX mechanism on the user equipment side is implemented, thereby ensuring a service quality for the user equipment while reducing power consumption of a system.

It should be noted that, the device 600 may be the user equipment, may be arranged within the user equipment or may be arranged separately from the user equipment, which is not limited in the present disclosure.

It should be understood that, although the function configuration examples of the devices in the wireless communication system according to the embodiments of the present disclosure have been described above with reference to FIGS. 1 to 6, these are merely examples but not limitations, and those skilled in the art may add, delete and/or combine the above units according to the principle of the disclosure, and all of these variations are considered to fall within the substantial scope of the present disclosure.

Figure 7:
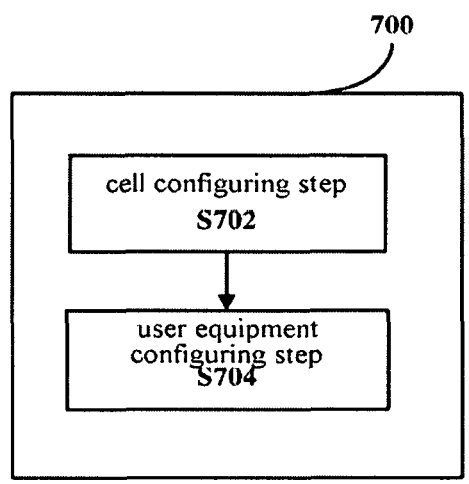
FIG. 7 is a flowchart showing a procedure example of a method in a wireless communication system according to an embodiment of the present disclosure.

Next, a procedure example of a method in a wireless communication system according to an embodiment of the present disclosure is described with reference to FIG. 7. FIG. 7 is a flowchart showing a procedure example of a method in a wireless communication system according to the present disclosure.

As shown in FIG. 7, a method 700 according to the embodiment may include a cell configuring step S702 and a user equipment configuring step S704.

In the cell configuring step S702, a periodic discontinuous transmission mode of a cell may be controlled and a parameter, including a period, of the periodic discontinuous transmission mode may be configured, according to a load condition of the cell and/or an inter-cell interference condition.

In the user equipment configuring step S704, a parameter, including a period, of a periodic discontinuous reception mode of user equipment may be configured according to the parameter of the periodic discontinuous transmission mode, so that the period of the periodic discontinuous reception mode of the user equipment is compatible with the period of the periodic discontinuous transmission mode.

Figure 8:
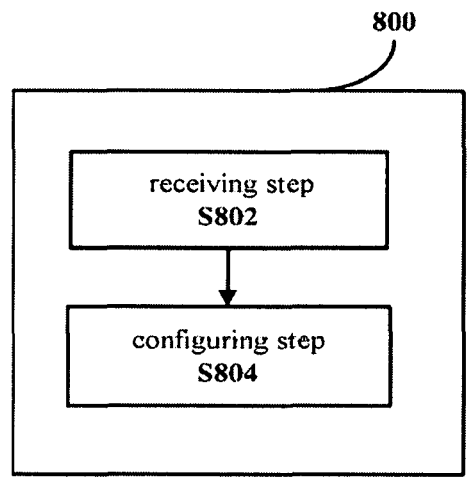
FIG. 8 is a flowchart showing a procedure example of a method in a wireless communication system according to an embodiment of the present disclosure.

Next, a procedure example of a method in a wireless communication system according to an embodiment of the present disclosure is described with reference to FIG. 8. FIG. 8 is a flowchart showing a procedure example of a method in a wireless communication system according to the present disclosure.

As shown in FIG. 8, a method 800 according to the embodiment may include a receiving step S802 and a configuring step S804.

In the receiving step S802, a configuration signaling regarding a periodic discontinuous reception mode may be received from a cell.

In the configuring step S804, the periodic discontinuous reception mode of user equipment may be configured according to the configuration signaling, so that a period of the periodic discontinuous reception mode of the user equipment is compatible with a period of a periodic discontinuous transmission mode of the cell.

It should be understood that, although the procedure examples of the methods in the wireless communication system according to the embodiments of the present disclosure have been described above with reference to FIGS. 7 and 8, these are merely preferable examples but not limitations, and those skilled in the art may modify, combine, sub-combine and alter the above procedures according to the principle of the present disclosure as actually required, and all of these variations are considered to fall within the substantial scope of the present disclosure.

In addition, it should be noted that, the method embodiments described with reference to FIGS. 7 and 8 correspond to the embodiments of the device 100 to device 500 described with reference to FIGS. 1 to 5 and the embodiment of the device 600 described with reference to FIG. 6 in the above respectively. Therefore, content, which are not described in detail in the method embodiments, may be referred to descriptions at corresponding positions in the device embodiments above, and will not be described repeatedly here.

Figure 9:
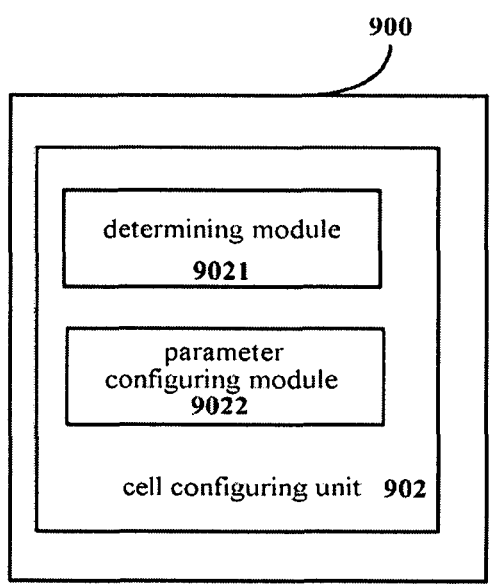
FIG. 9 is a block diagram showing a function configuration example of a device in a wireless communication system according to an embodiment of the present disclosure.

FIG. 9 is a block diagram showing a function configuration example of a device in a wireless communication system according to an embodiment of the present disclosure.

As shown in FIG. 9, a device 900 in the wireless communication system according to the embodiment may include a cell configuring unit 902. The cell configuring unit 902 may be configured to control a periodic discontinuous transmission mode of a cell and configure a parameter, including a period, of the periodic discontinuous transmission mode, according to a load condition of the cell and/or an inter-cell interference condition.

Preferably, as shown in FIG. 9, the cell configuring unit 902 may further include a determining module 9021 and a parameter configuring module 9022.

The determining module 9021 may be configured to determine whether to switch on the periodic discontinuous transmission mode of the cell based on the load condition of the cell and/or the inter-cell interference condition. Preferably, the determining module 9021 determines to switch on the periodic discontinuous transmission mode of the cell in a case that the load condition of the cell is less than a first predetermined threshold and/or the inter-cell interference condition is greater than a second predetermined threshold.

The parameter configuring module 9022 may be configured to configure, in response to determining to switch on the periodic discontinuous transmission mode of the cell by the determining module 9021, the parameter of the periodic discontinuous transmission mode based on the load condition of the cell and/or the inter-cell interference condition, the parameter including a period, an activation time duration and a sleeping time duration of the period, and the cell does not provide a data transmission service to a user equipment in the sleeping time duration.

Figure 10:
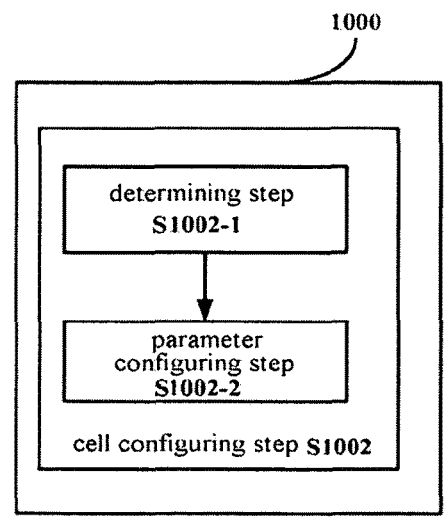
FIG. 10 is a flowchart showing a procedure example of a method in a wireless communication system according to an embodiment of the present disclosure.

Corresponding to the device shown in FIG. 9, FIG. 10 is a flowchart showing a procedure example of a method in a wireless communication system according to an embodiment of the present disclosure.

As shown in FIG. 10, a method 1000 in the wireless communication system according to the embodiment may include a cell configuring step S1002. In the cell configuring step S1002, a periodic discontinuous transmission mode of a cell may be controlled and a parameter, including a period, of the periodic discontinuous transmission mode may be configured, according to a load condition of the cell and/or an inter-cell interference condition.

Preferably, as shown in FIG. 10, the cell configuring step S1002 may further include a determining step S1002-1 and a parameter configuring step S1002-2.

In the determining step S1002-1, it is determined whether to switch on the periodic discontinuous transmission mode of the cell based on the load condition of the cell and/or the inter-cell interference condition. Preferably, it is determined to switch on the periodic discontinuous transmission mode of the cell in a case that the load condition of the cell is less than a first predetermined threshold and/or the inter-cell interference condition is greater than a second predetermined threshold.

In the parameter configuring step S1002-2, the parameter of the periodic discontinuous transmission mode may be configured based on the load condition of the cell and/or the inter-cell interference condition, in response to determining to switch on the periodic discontinuous transmission mode of the cell in the determining step, the parameter including a period, an activation time duration and a sleeping time duration of the period, and the cell does not provide a data transmission service to a user equipment in the sleeping time duration.

It can be seen that, by switching on/off the periodic DTX mode of the cell and configuring the parameter such as the period, the activation time duration and the sleeping time duration and the like of the DTX mode according to the load condition of the cell and/or the inter-cell interference condition, power consumption and interference can be reduced, as compared with the conventional technology in which the cell is generally maintained in a normally on state.

Further, an embodiment of the present disclosure further provides a device, which is arranged in a wireless communication system and may include a circuit configured to perform: a cell configuring step of controlling a periodic discontinuous transmission mode of a cell and configuring a parameter, comprising a period, of the periodic discontinuous transmission mode, according to a load condition of the cell and/or an inter-cell interference condition; and a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

Further, an embodiment of the present disclosure further provides a device, which is arranged in a wireless communication system and may include a circuit configured to perform: a receiving step of receiving from a cell a configuration signaling regarding a periodic discontinuous reception mode; and a configuring step of configuring the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

Further, an embodiment of the present disclosure further provides a device, which is arranged in a wireless communication system and may include a circuit configured to perform: a cell configuring step of controlling a periodic discontinuous transmission mode of a cell and configuring a parameter, comprising a period, of the periodic discontinuous transmission mode, according to a load condition of the cell and/or an inter-cell interference condition. The cell configuring step further includes: a determining step of determining whether to switch on the periodic discontinuous transmission mode of the cell based on the load condition of the cell and/or the inter-cell interference condition; and a parameter configuring step of configuring, in response to determining to switch on the periodic discontinuous transmission mode in the determining step, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which it is determined in the determining step to switch on the periodic discontinuous transmission mode of the cell in a case that the load condition of the cell is less than a first predetermined threshold and/or the inter-cell interference condition is greater than a second predetermined threshold.

Further, an embodiment of the present disclosure further provides a storage medium including machine-readable program codes which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition; and a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

Further, an embodiment of the present disclosure further provides a program product including machine-executable instructions which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition; and a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode, in which each one period of the periodic discontinuous transmission mode comprises an activation time duration and a sleeping time duration, and the cell provides a service to the user equipment during the activation time duration.

Further, an embodiment of the present disclosure further provides a storage medium including machine-readable program codes which, when executed on an information processing device, cause the information processing device to perform: a receiving step of receiving from a cell a configuration signaling regarding a periodic discontinuous reception mode; and a configuring step of configuring the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

Further, an embodiment of the present disclosure further provides a program product including machine-executable instructions which, when executed on an information processing device, cause the information processing device to perform: a receiving step of receiving from a cell a configuration signaling regarding a periodic discontinuous reception mode; and a configuring step of configuring the periodic discontinuous reception mode of user equipment according to the configuration signaling, in which a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration.

Further, an embodiment of the present disclosure further provides a storage medium including machine-readable program codes which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition. The cell configuring step further includes: a determining step of determining whether to switch on the periodic discontinuous transmission mode of the cell based on the load condition of the cell and/or the inter-cell interference condition; and a parameter configuring step of configuring, in response to determining to switch on the periodic discontinuous transmission mode in the determining step, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which it is determined in the determining step to switch on the periodic discontinuous transmission mode of the cell in a case that the load condition of the cell is less than a first predetermined threshold and/or the inter-cell interference condition is greater than a second predetermined threshold.

Further, an embodiment of the present disclosure further provides a program product including machine-executable instructions which, when executed on an information processing device, cause the information processing device to perform: a cell configuring step of controlling a periodic discontinuous transmission mode of a cell and configuring a parameter, comprising a period, of the periodic discontinuous transmission mode, according to a load condition of the cell and/or an inter-cell interference condition. The cell configuring step further includes: a determining step of determining whether to switch on the periodic discontinuous transmission mode of the cell based on the load condition of the cell and/or the inter-cell interference condition; and a parameter configuring step of configuring, in response to determining to switch on the periodic discontinuous transmission mode in the determining step, the parameter of the periodic discontinuous transmission mode based on the load condition of the cell and/or the inter-cell interference condition, in which the parameter comprises a period, an activation time duration and a sleeping time duration of the period, and the cell does not provide a data transmission service to user equipment during the sleeping time duration, and in which it is determined in the determining step to switch on the periodic discontinuous transmission mode of the cell in a case that the load condition of the cell is less than a first predetermined threshold and/or the inter-cell interference condition is greater than a second predetermined threshold.

It should be understood that, the machine-executable instructions in the storage medium and the program product according to the embodiments of the present disclosure may also execute methods corresponding to the device embodiments described above, and thus contents which are not described in detail here may be referred to foregoing descriptions at corresponding positions of the device embodiments, and will not be described repeatedly here.

Accordingly, a storage medium on which the above program product including machine executable instructions is carried is also included in the present disclosure. The storage medium includes but not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1100 illustrated in FIG. 11, which can perform various functions when various programs are installed thereon.

Figure 11:
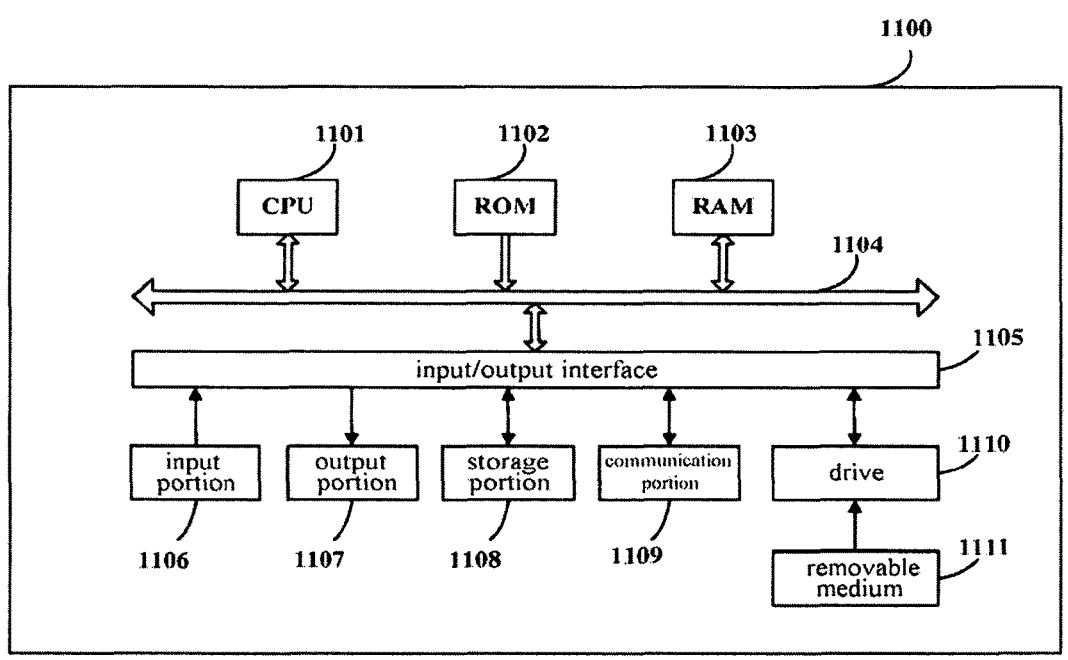
FIG. 11 is a block diagram showing an exemplary structure of a personal computer serving as an information processing device that may be adopted in an embodiment of the present disclosure.

In FIG. 11, a Central Processing Unit (CPU) 1101 performs various processes according to a program stored in a Read Only Memory (ROM) 1102 or loaded from a storage portion 1108 into a Random Access Memory (RAM) 1103 in which data required when the CPU 1101 performs the various processes is also stored as needed.

The CPU 1101, the ROM 1102 and the RAM 1103 are connected to each other via a bus 1104 to which an input/output interface 1105 is also connected.

The following components are connected to the input/output interface 1105: an input portion 1106 including a keyboard, a mouse, etc.; an output portion 1107 including a display, e.g., a Cathode Ray Tube (CRT), a Liquid Crystal Display (LCD), etc., a speaker, etc.; a storage portion 1108 including a hard disk, etc.; and a communication portion 1109 including a network interface card, e.g., an LAN card, a modem, etc. The communication portion 1109 performs a communication process over a network, e.g., the Internet.

A drive 1110 is also connected to the input/output interface 1105 as needed. A removable medium 1111, e.g., a magnetic disk, an optical disk, an magneto optical disk, a semiconductor memory, etc., can be installed on the drive 1110 as needed so that a computer program fetched therefrom can be installed into the storage portion 1108 as needed.

In the case that the foregoing series of processes are performed in software, a program constituting the software is installed from a network, e.g., the Internet, etc., or a storage medium, e.g., the removable medium 1111, etc.

Those skilled in the art shall appreciate that such a storage medium will not be limited to the removable medium 1111 illustrated in FIG. 11 in which the program is stored and which is distributed separately from the apparatus to provide a user with the program. Examples of the removable medium 1111 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1102, a hard disk included in the storage portion 1108, etc., in which the program is stored and which is distributed together with the apparatus including the same to the user.

APPLICATION EXAMPLE 1

A PSS/SSS synchronous signal is transmitted fixedly in a time slot of number 0 and a time slot of number 5 in an LTE sub-frame. Therefore, it needs to consider the transmission of the synchronous signal in these time slots in the DTX scheme according to the present disclosure. In other words, in a case that the DTX is applied into an existing LTE system, these time slots should be set to be located in the activation time duration of the DTX.

It is known that a state of a small cell on/off are classified as a sub-frame level, a semi-static state and a sleeping state based on different scales of an operating period thereof. In the existing LTE technology, it is difficult to achieve dynamic scheduling in the sub-frame level, and scheduling in the sleeping state is mainly discussed in RAN3 due to a too large time scale. Therefore, discussion in RAN 1/2 mainly focuses on a solution in the semi-static state, and a granularity of the periodic DTX scheme according to the present disclosure is similar to that of the scheduling solution in the semi-static state, which is between several hundreds of milliseconds and several seconds in an order of magnitude.

With the evolution of standardization of the LTE, support for the small cell may become better and better. Therefore, the synchronous signal and the small cell discovery signal may be changed in the future. These potential changes may facilitate achieving the periodic DTX mechanism according to the present disclosure. For example, the synchronous signal is not fixed to be transmitted in the time slots of number 0 and number 5, thereby improving the flexibility in setting the DTX.

APPLICATION EXAMPLE 2

At present, LTE-U is one of hot topics of 3GPP, and the present disclosure may be optimized for deployment scenarios of LTE-U. There are many undetermined frequency spectrum interferences since LTE-U is in an unlicensed frequency band. In an LTE-U scenario, the DTX is configured for a cell which uses spectrum resources in the unlicensed frequency band to reduce interference on licensed users. After a DTX/DRX period has been determined for the cell and the user equipment, since requirements of some user equipment can not be met, additional resources are needed to be allocated to these user equipment. The implementation manner may include: extending the activation time duration by a timer; configuring a sub periodic DTX; and coordinating with a neighboring cell. In the LTE-U, when selecting these alternative schemes, an interference condition over an air interface of LTE-U needs to be considered. In this way, the cell may select an optimum scheme based on interference conditions in different alternative schemes.

The preferred embodiments of the present disclosure have been described above with reference to the drawings, however, the present disclosure is of course not limited to above examples. Various changes and modifications may be obtained by those skilled in the art within the scope of the appended claims, and it should be understood that these changes and modifications will naturally fall within the technical scope of the present disclosure.

For example, multiple functions included in one unit in the above embodiments may be implemented by separated devices. Alternatively, multiple functions implemented by multiple units in the above embodiments may be respectively implemented by separated devices. In addition, one of the above functions may be implemented by multiple units. Needless to say, these configurations are included in the technical scope of the present disclosure.

In the specification, the steps described in the flowcharts include not only the processes performed in the stated order chronologically, but also the processes which are performed in parallel or separately but not necessarily performed chronologically. In addition, even in the step of processing chronologically, needless to say, the order can be changed properly.

The invention claimed is:

1. A device for use in a wireless communication system, the device comprising:
   processing circuitry configured to:
      control a periodic discontinuous transmission mode of a cell and configure a parameter, comprising a period, of the periodic discontinuous transmission mode, according to a load condition of the cell or an inter-cell interference condition;
      configure, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode; and
      determine to switch on the periodic discontinuous transmission mode of the cell when the inter-cell interference condition is greater than a predetermined threshold,
   wherein each one period of the periodic discontinuous transmission mode comprises an activation time duration and a sleeping time duration, and the cell provides a service to the user equipment during the activation time duration,
   wherein the processing circuitry is further configured to:
      enable the cell to interact with neighboring interfering cell information about parameters of respective periodic discontinuous transmission modes, and
      make, according to the interacted information about the parameters, the activation time duration within the period of the periodic discontinuous transmission mode of the cell be spaced apart from the activation time duration within the period of the periodic discontinuous transmission mode of the neighboring interfering cell.

2. The device according to claim 1, wherein the processing circuitry is further configured to configure the period of the periodic discontinuous reception mode of the user equipment, so that when the periodic discontinuous reception mode of the user equipment is in an activation time duration, the periodic discontinuous transmission mode of the cell is also in the activation time duration, and the period of the periodic discontinuous reception mode is an integer multiple of the period of the periodic discontinuous transmission mode.

3. The device according to claim 1, wherein the processing circuitry is further configured to group the user equipment, so that periods of periodic discontinuous reception modes of user equipment in a same group keep aligned with each other, and activation time durations of the periodic discontinuous reception modes of user equipment in different groups are offset from each other.

4. The device according to claim 1, wherein the processing circuitry is further configured to:
   allocate the activation time duration in one period of the periodic discontinuous transmission mode of the cell according to grouping of the user equipment, so that different activation time durations are allocated to different groups of user equipment, and
   configure, according to an activation time duration allocated to the user equipment, so that the activation time duration within one period of the periodic discontinuous reception mode of the user equipment matches with the activation time duration allocated to the user equipment.

5. The device according to claim 4, wherein the processing circuitry is further configured to: set, in a case that there is only one activation time duration within one period of the periodic discontinuous transmission mode of the cell, different activation time duration offsets for different groups of user equipment, and allocate, in a case that there are a plurality of activation time durations within one period of the periodic discontinuous transmission mode of the cell, different activation time durations of the plurality of activation time durations to different groups of user equipment.

6. The device according to claim 5, wherein the processing circuitry is further configured to allocate, in a case that a service with high real-time performance or a large data transfer amount arrives at the user equipment and a currently configured periodic discontinuous transmission mode does not meet a current service requirement of the user equipment after the periodic discontinuous transmission mode of the cell has been switched on, the activation time durations for one or more groups of user equipment within one period of the periodic discontinuous transmission mode of the cell to the user equipment to serve the user equipment.

7. The device according to claim 1,
   wherein the processing circuitry is further configured to configure a sub periodic discontinuous transmission mode for the cell, and to make a period of a sub periodic discontinuous reception mode of the user equipment be aligned with a period of the sub periodic discontinuous transmission mode, in a case that a communication requirement of the user equipment is not met in the activation time duration within one period of the periodic discontinuous transmission mode.

8. The device according to claim 1, wherein the processing circuitry is further configured to: offload a service of the user equipment to a cell in which the periodic discontinuous transmission mode is not switched on, or utilize, if the user equipment is capable of supporting carrier aggregation or dual connection, activation time durations within periods of the periodic discontinuous transmission modes of different cells to serve the user equipment in coordination, in a case that the cell does not support the service.

9. The device according to claim 1, wherein the processing circuitry is further configured to switch off the periodic discontinuous transmission mode of the cell in a case that an average load condition of the cell within a predetermined time duration is higher than a predetermined threshold or in a case that a service of certain user equipment within the cell is not implemented in the periodic discontinuous transmission mode.

10. The device according to claim 1, wherein the processing circuitry is further configured to configure a ratio of the activation time duration to the sleeping time duration within one period of the periodic discontinuous transmission mode of the cell to be close to a current resource utilization rate of the cell.

11. The device according to claim 1, wherein the cell is a small cell.

12. The device according to claim 1, wherein:
the processing circuitry is further configured to configure so that the greater a load is, the shorter the period of the periodic discontinuous transmission mode is or the longer the activation time duration of the periodic discontinuous transmission mode is, and the smaller the load is, the longer the period of the periodic discontinuous transmission mode is or the shorter the activation time duration of the periodic discontinuous transmission mode is, and
the processing circuitry is further configured to configure so that the shorter the period of the periodic discontinuous transmission mode is, the shorter the period of the periodic discontinuous reception mode is, and the longer the period of the periodic discontinuous transmission mode is, the longer the period of the periodic discontinuous reception mode is.

13. A device for use in a wireless communication system, the device comprising:
processing circuitry configured to:
receive from a cell a configuration signaling regarding a periodic discontinuous reception mode, a periodic discontinuous transmission mode of the cell being switched on when an inter-cell interference condition is greater than a predetermined threshold; and
configure the periodic discontinuous reception mode of user equipment according to the configuration signaling,
wherein a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration,
wherein the processing circuitry is further configured to:
enable the cell to interact with neighboring interfering cell information about parameters of respective periodic discontinuous transmission modes, and
make, according to the interacted information about the parameters, the activation time duration within the period of the periodic discontinuous transmission mode of the cell be spaced apart from the activation time duration within the period of the periodic discontinuous transmission mode of the neighboring interfering cell.

14. The device according to claim 13, wherein when the periodic discontinuous reception mode of the user equipment is in an activation time duration, the periodic discontinuous transmission mode of the cell is also in the activation time duration, and the period of the periodic discontinuous reception mode is an integer multiple of the period of the periodic discontinuous transmission mode.

15. The device according to claim 13, wherein:
the processing circuitry is further configured to configure so that the greater a load is, the shorter the period of the periodic discontinuous transmission mode is or the longer the activation time duration of the periodic discontinuous transmission mode is, and the smaller the load is, the longer the period of the periodic discontinuous transmission mode is or the shorter the activation time duration of the periodic discontinuous transmission mode is, and
the processing circuitry is further configured to configure so that the shorter the period of the periodic discontinuous transmission mode is, the shorter the period of the periodic discontinuous reception mode is, and the longer the period of the periodic discontinuous transmission mode is, the longer the period of the periodic discontinuous reception mode is.

16. A method in a wireless communication system, the method comprising:
a cell configuring step of controlling a periodic discontinuous transmission mode of a cell and configuring a parameter, comprising a period, of the periodic discontinuous transmission mode, according to a load condition of the cell or an inter-cell interference condition, the periodic discontinuous transmission mode of the cell being switched on when the inter-cell interference condition is greater than a predetermined threshold; and
a user equipment configuring step of configuring, according to the parameter of the periodic discontinuous transmission mode, a parameter, comprising a period, of a periodic discontinuous reception mode of user equipment, so that the period of the periodic discontinuous reception mode of the user equipment is compatible with the period of the periodic discontinuous transmission mode,
wherein each one period of the periodic discontinuous transmission mode comprises an activation time duration and a sleeping time duration, and the cell provides a service to the user equipment during the activation time duration,
the method further comprising:
enabling the cell to interact with neighboring interfering cell information about parameters of respective periodic discontinuous transmission modes, and
making, according to the interacted information about the parameters, the activation time duration within the period of the periodic discontinuous transmission mode of the cell be spaced apart from the activation time duration within the period of the periodic discontinuous transmission mode of the neighboring interfering cell.

17. A method in a wireless communication system, the method comprising:
a receiving step of receiving from a cell a configuration signaling regarding a periodic discontinuous reception mode; and
a configuring step of configuring the periodic discontinuous reception mode of user equipment according to the configuration signaling, a periodic discontinuous transmission mode of the cell being switched on when an inter-cell interference condition is greater than a predetermined threshold, wherein a period of the periodic discontinuous reception mode of the user equipment is compatible with a period of a periodic discontinuous transmission mode of the cell, each one period of the periodic discontinuous transmission mode comprises an activation time duration and a sleeping time duration, and the cell provides a service to the user equipment during the activation time duration, the method further comprising:

enabling the cell to interact with neighboring interfering cell information about parameters of respective periodic discontinuous transmission modes, and making, according to the interacted information about the parameters, the activation time duration within the period of the periodic discontinuous transmission mode of the cell be spaced apart from the activation time duration within the period of the periodic discontinuous transmission mode of the neighboring interfering cell.

18. A device for use in a wireless communication system, the device comprising:

processing circuitry configured to:

control a periodic discontinuous transmission mode of a cell and configure a parameter, comprising a period, of the periodic discontinuous transmission mode, according to an inter-cell interference condition;

determine whether to switch on the periodic discontinuous transmission mode of the cell based on the inter-cell interference condition, the periodic discontinuous transmission mode of the cell being switched on when an inter-cell interference condition is greater than a predetermined threshold; and configure, in response to determining to switch on the periodic discontinuous transmission mode, the parameter of the periodic discontinuous transmission mode based on the inter-cell interference condition, wherein the parameter comprises a period, an activation time duration and a sleeping time duration of the period, and the cell does not provide a data transmission service to user equipment during the sleeping time duration, wherein the processing circuitry is further configured to determine to switch on the periodic discontinuous transmission mode of the cell in a case that the inter-cell interference condition is greater than a second predetermined threshold, wherein the processing circuitry is further configured to: enable the cell to interact with neighboring interfering cell information about parameters of respective periodic discontinuous transmission modes, and make, according to the interacted information about the parameters, the activation time duration within the period of the periodic discontinuous transmission mode of the cell be spaced apart from the activation time duration within the period of the periodic discontinuous transmission mode of the neighboring interfering cell.

19. A method in a wireless communication system, the method comprising:

a cell configuring step of controlling a periodic discontinuous transmission mode of a cell and configuring a parameter, comprising a period, of the periodic discontinuous transmission mode, according to a load condition of the cell or an inter-cell interference condition, the periodic discontinuous transmission mode of the cell being switched on when an inter-cell interference condition is greater than a predetermined threshold, wherein the cell configuring step further comprises:

a determining step of determining whether to switch on the periodic discontinuous transmission mode of the cell based on the inter-cell interference condition; and a parameter configuring step of configuring, in response to determining to switch on the periodic discontinuous transmission mode in the determining step, the parameter of the periodic discontinuous transmission mode based on the inter-cell interference condition, wherein the parameter comprises a period, an activation time duration and a sleeping time duration of the period, and the cell does not provide a data transmission service to user equipment during the sleeping time duration, wherein it is determined in the determining step to switch on the periodic discontinuous transmission mode of the cell in a case that the inter-cell interference condition is greater than a second predetermined threshold, the method further comprising:

enabling the cell to interact with neighboring interfering cell information about parameters of respective periodic discontinuous transmission modes, and making, according to the interacted information about the parameters, the activation time duration within the period of the periodic discontinuous transmission mode of the cell be spaced apart from the activation time duration within the period of the periodic discontinuous transmission mode of the neighboring interfering cell.

\* \* \* \* \*